UNITED STATES PATENT OFFICE.

JOKICHI TAKAMINE, OF CHICAGO, ILLINOIS.

PREPARING AND MAKING MOTO.

SPECIFICATION forming part of Letters Patent No. 525,821, dated September 11, 1894.

Application filed June 18, 1891. Serial No. 396,705. (No specimens.) Patented in England April 2, 1891, No. 5,700, and October 12, 1891, No. 17,374; in France April 13, 1891, No. 214,033, and October 19, 1891, No. 216,840; in Belgium April 14, 1891, No. 94,522, and October 24, 1891, No. 96,937; in Canada December 12, 1891, Nos. 37,961 and 37,962, and in Austria-Hungary July 2, 1892, No. 40,399, and September 28, 1892, No. 16,519.

*To all whom it may concern:*

Be it known that I, JOKICHI TAKAMINE, a subject of the Emperor of Japan, residing at Chicago, in the county of Cook and State of Illinois, have invented a new and useful Improvement in Preparing and Making Taka-Moto, of which the following is a specification, and for which I have obtained Letters Patent in foreign countries as follows: Canada, Nos. 37,961 and 37,962, dated December 12, 1891; Belgium, No. 94,522, dated April 14, 1891, and No. 96,937, dated October 24, 1891; France, No. 214,033, dated April 13, 1891, and No. 216,840, dated October 19, 1891; Austria-Hungary, No. 40,399, dated July 2, 1892, and No. 16,519, dated September 28, 1892, and Great Britain, No. 5,700, dated April 2, 1891, and No. 17,374, dated October 12, 1891.

The object of my invention is to prepare taka-moto which is a liquor containing alcoholic ferment cells, developed and multiplied in suitable nourishing solution, and similar to the substance known as moto, for use in the arts, in a healthier, and of longer keeping qualities, more active and concentrated condition; and to mature the same in a shorter period, and more economically, than by the old process of making moto.

The term moto is applied to a liquor containing ferment cells, prepared from the mixture of rice-koji, steamed rice and water. Taka-moto corresponds to the article known as yeast in its use in the arts, such as alcoholic fermentation, bread making, &c.

In the old process of making moto six parts of clean steamed rice with two and one-half parts of rice koji and seven and one-half parts of water are mixed together, or in about that proportion and the mixture occasionally stirred at the natural winter temperature varying from 0° to 15° centigrade for five or six days. After this period the temperature of the mixture is raised by placing in it a tub containing water heated to nearly boiling point, and it is kept at a temperature varying from 15° to 40° centigrade for from four to ten days. During the early part of this stage, conversion of the starch into sugars begins and proceeds increasingly and the multiplication of the ferment cells, and alcoholic fermentation go on at the same time. At the latter end of this period, the taste of sugar disappears and the taste of alcohol takes its place, when the moto is considered to be finished and ready for use.

The defects of the old process of making moto as described and which I remedy by my process of making taka-moto, are:

First. The only substance used for any practical growth of the ferment cells was rice, and no process or treatment was known by which other, natural or artificial substances containing such necessary ingredients, could be employed.

Second. The conversion of the starch into sugars by the diastase contained in the koji being made at a low temperature a complete conversion is not attained; in some instances as much as sixteen per cent. of the finished moto consisting of unconverted starch. The presence of this unconverted starch causes acid and other injurious fermentations, thus injuring both the qualities of the moto and the subsequent fermentations.

Third. The temperature of the mixture is not uniform nor regular and often over-heated by reason of the crude and imperfect method employed in heating it. Consequently the development of the ferment cells is irregular and imperfect, and some of the cells are invariably killed or injured by the heat of the hot water and the moto is from this cause, also subject to injurious fermentations.

Fourth. The entire process being very slow, the moto is necessarily exposed for a great length of time to injurious bacteria in the surrounding air.

Fifth. The grains of the rice and of the rice-koji are employed in an unbroken condition and the only means of crushing the grain being the stirrings to which the mixture is subjected, much of the starch in the grains is not released, and remains from this cause unconverted into sugars; resulting not only in a waste of material, but in an injury to the quality of the moto.

In my process of making taka-moto, I employ as one of the elements or ingredients taka-koji. Taka-koji is made from comminuted or broken grains of cereals, preferably from which the greater part of starchy matter has been removed or other substances containing the necessary ingredients for the growth of the fungi employed. The materials employed in making taka-koji are brans of cereals, such as wheat bran, corn bran, rye bran, oat bran and other brans supplying the necessary ingredients for the growth of the fungi and the other substances employed are: slop (solids) from alcoholic distillation—slop or grain (solids) from beer brewing—bran and slop from glucose, starch factories and seed oil cake. Any bran, husk, sawdust, crash or other material saturated with any of the above mentioned slop, or other nutritious substances liquids or solids, or both combined, such as paste of cooked cereals or albuminoid substances and all other substances whether in their natural state or artificially treated which contained the necessary ingredients for the growth of the fungi.

After being thoroughly steamed and heated for purposes of gelatinizing any starch contained and for the sterilization of the substances, the mass is allowed to cool down to a temperature below 35° when about one-fifty thousandth to one-ten thousandth part in weight of the bran or other substances employed, of pure taka-moyashi or about one to three one-thousandths parts in weight of the brans or other substances employed of the taka-moyashi is added to and thoroughly mixed with the mass of bran or other substances employed.

Taka-moyashi is a mass of brans or other substances fertilized by a defined artificial compound and containing fully matured or ripe spores of mycelial fungi, *Eurotium oryzæ* (Ahlburg) *Aspergillus* species, *Mucor* species and *Penecillium* species.

Taka-moyashi has a moldy appearance and is of a color depending largely upon the brans or other substance employed, and also upon the particular species of mycelial fungi employed. Pure taka-moyashi consists of the matured seed or spores of the mycelial fungi, separated by sifting or otherwise from the brans or other substances on which it is grown. The pure taka-moyashi then has the form of a fine dry powder, the color varying with the species of fungi used, consisting of matured seed cells of the mycelial fungi employed.

The pure taka-moyashi or taka-moyashi is thoroughly mixed with the mass of bran or other substances employed and allowed to develop and multiply under proper manipulation and temperature until the proper stage of growth as taka-koji is attained, indicated by the appearance of a fungus growth. The mass is then cooled down to an ordinary atmospheric temperature and dried if necessary and is ready for immediate use. Taka-koji presents in this form a moldy appearance; its color depending largely upon the bran or other substances used, and also the species of fungi employed. It possesses both diastatic and alcoholic fermenting properties, the diastatic properties residing in the brans or other substances employed and the fermenting properties are due to fungus plants. When the diastatic and fermenting properties are both profitably utilized at the same time, the taka-koji may be used in its condition as described.

Where taka koji is used for conversion alone or where the fermenting power alone of the taka-koji is utilized, the taka-koji after being thoroughly dried is separated into two parts by passing through a sieve or otherwise; one part containing in the form of a dry fine powder the spores of the fungus or the ferment cells; and the other part containing the bran or other substances employed, which contain the diastatic properties of the taka-koji. These two resultant products, the one the ferment cells portion and the other, the diastase containing part, are used separately and independently of each other. Or the taka-koji may be steeped in water and the diastatic and fermenting properties may be separated from the substance on which it grows by stirring with water and pressing through coarse fabric, whereby the diastase will dissolve in the water, and the ferment cell portion will become detached and remain suspended in the liquid. These may be separated the one from the other by filtration or when the diastatic portion only is required for use, it is extracted by percolation of water through the mass, or the taka-koji may be steeped in water and filtered. The clear solution thus obtained contains the diastatic portion alone.

To the diastatic portion of the taka-koji I have applied the term taka-koji diastase and to the spores or ferment cells when separated I have applied the term taka-koji ferment.

I have pending in the United States Patent Office an application for Letters Patent, Serial No. 396,706, filed June 18, 1891, in which I describe and claim the process of preparing and making taka-moyashi, and pure taka-moyashi; also another application, No. 396,611, filed June 17, 1891, in which I describe the process of preparing and making taka-koji, taka-koji ferment and taka-koji diastase, and in which I claim the products of said processes.

In my process of making taka-moto any of the cereals or starch containing substances, or substances which supply the necessary ingredients for the growth of the ferment cells may be employed, but I prefer to use brans of the different cereals including shorts, middlings, &c., (which are cheaper and more efficient than the whole or comminuted grains) and taka-koji or taka-koji diastase. To these substances, &c., first ground to a fine meal or in a comminuted condition such as bran, about one to three parts in weight of water is added and in which they are thoroughly cooked, preferably at about a temperature of 155° centigrade under pressure so that all of the starch cells are open and gelatinized. It is then cooled down to a temperature of from 50° to 70° centigrade. To this mass is added from five to twenty per cent. in weight of the cereals or other substances used of taka-koji diastase either in a solid or liquid form and well stirred and kept at the above temperature for from ten to sixty minutes, during which period the thorough conversion of the starch in the mass into sugars is made. It is then allowed to cool down to about 20° centigrade, being constantly agitated by stirring. Then there is added to the solution or mash the taka-koji ferment being the spores or ferment cells of an amount of taka koji equivalent to that from which the taka-koji diastase was taken and employed to make the conversion. Thus taka-koji ferment may be used either in the dry form of powder or in the water where the cells are held in suspension. The solution or mash is then allowed to remain for from two to five days with occasional stirring, care being taken to keep the temperature of the solution or mash not to exceed about 40° centigrade. This is conveniently accomplished by the use of a vessel fitted inside with a coil through which warm and cold water can be passed at will.

When the maximum point in the development and multiplication of the ferment cells is reached, which is generally indicated by the change in the taste of the solution or mash from a sweet to an alcoholic flavor the solution or mash is preferably cooled down to a temperature below 20° centigrade and the taka-moto as made by my process is ready for use. Taka-moto as thus prepared and developed possesses the ferment property far in excess of any known ferment.

Taka-moto as made by my process may be perpetuated, reproduced and augmented by transplanting a very small portion of taka moto previously made as above described to the saccharine solution obtained by first cooking cereals or starch containing root crops with one to five parts of its weight of water, and cooling to from 50° to 70° centigrade and converting by the addition of the water extract of the diastatic portion of taka-koji obtained from taka-koji corresponding to from twenty to one hundred per cent. of cereals, &c., filtering or not filtering after conversion (filtered solution gives purer taka-moto); or to the heated (about 70° centigrade) and filtered extract of the bran of wheat or other cereals first mixed with and digested with five to twenty per cent. of taka-koji or with the diastatic extract of the same proportion of taka-koji. The ferment cells develop and multiply abundantly and may be used for the same purpose in the arts as taka-moto originally prepared.

The diastatic portion of the taka-koji contains nitrogenous and other materials in such a condition as are most suited for the nourishment of ferment cells, and I discovered that the diastatic portion of taka-koji also induces the gluten, &c., of wheat bran and other cereal bran to change into more assimilable substances.

Taka-moto as above obtained originally from the ferment cells portion of taka-koji, or as obtained by perpetuation, reproducing and augmentation, in fresh nutritious solution, of small quantities or, ordinary taka-moto, may be filtered and the excess of still adhering liquid pressed out by suitable means with or without previous washing with simple water or cold watery extract of hops so as to form a solid pasty mass, and may be used as such in place of ordinary yeast in its various uses in the arts as bread making, &c.

Taka-koji diastase, while possessing some of the properties of ordinary malt-diastase, is, however, an entirely different substance, for the reason that it does not give the characteristic blue coloration that is given when malt diastase is treated with guaiacum and the tincture of hydrogen peroxide. Moreover, it possesses the property of converting starchy material into sugar in a far greater degree than does malt diastase, and the mass is more completely, economically and fully converted by its use than by the use of the malt diastase.

Having thus described my invention, what I claim as new, and desire to secure by Letters Patent of the United States, is—

1. The process of preparing and making taka-moto, which consists, first, in cooking a given quantity of starch containing material such as the cereals after they have been ground at a temperature high enough to gelatinize the starch contained; then adding the taka-koji diastase of a quantity of taka-koji equal to from ten to twenty per cent. in weight of the starch containing material and converting the starchy material into sugar; second, adding the taka-koji ferment of a quantity of taka-koji equal to from ten to twenty per cent. of the starch containing material to the cooled saccharine solution leaving the solution until the ferment cells are developed and multiplied to their maximum efficiency; all substantially as shown.

2. The process of preparing and making taka-moto which consists, first, in cooking starch containing materials such as the ground or comminuted cereals mixed with from one to three parts of water, preferably under pressure up to a temperature of about 155° centigrade for from ten to sixty minutes, then cooling the same to a temperature between 50° and 70° centigrade, then adding the taka-koji diastase of a quantity of taka-moto equal to from ten to twenty per cent. of the starch containing material, and stirring and mixing until the starchy material has been converted into sugar, and then cooling the solution to a temperature below 40° centigrade; adding to the solution the taka-koji ferment of a quantity of taka-koji equivalent to from ten to twenty per cent. of the starch containing material, and stirring and mixing the same, then leaving the same with occasional stirring for from two to five days until the taka-moto is developed and multiplied all substantially as described.

3. The process of preparing and making taka-moto which consists, first, in cooking starch containing materials such as the ground or comminuted cereals mixed with from one to three parts of water, preferably under pressure up to a temperature of about 155° centigrade for from ten to sixty minutes, then cooling the same to a temperature between 50° and 70° centigrade and then adding the taka-koji diastase of a quantity of taka-koji equal to from ten to twenty per cent. of the starch containing material, and stirring and mixing until the starchy material has been converted into sugar, and then cooling the solution to a temperature below 40° centigrade, adding to the solution the taka-koji ferment of a quantity of taka koji equivalent to from ten to twenty per cent. of the starch containing material and stirring and mixing the same, then leaving the same with occasional stirring for from two to five days until the taka-moto is developed and multiplied; then extracting the main liquid portion and pressing the residuum so as to form a solid or pasty mass; all substantially as described.

4. A composition of matter, in the form of a liquid or thin paste composed principally of water and alcohol with a slight residuum of gelatinized starch, sugars and fiber, and containing throughout its mass the active spores or ferment cells of a mycelial fungus which have first been developed in the air to a stage known as taka-koji whose spores or seeds have next been developed and multiplied in sugar solution in the presence of slight fermentation; all substantially as described.

5. As a composition of matter, taka-moto in a partially solid or pasty condition consisting of a pressed mass of the active spores or ferment cells of a mycelial fungus, which has first been developed in the air to a stage known as taka-koji, whose spores have next been developed and multiplied in sugar solutions in the presence of slight fermentation; and from which mass the main liquid in which the spores were developed has been pressed; all substantially as described.

6. The process of preparing and propagating taka-moto which consists in adding to the heated and filtered extract of bran of wheat mixed with the diastatic portion of taka-koji a small portion of previously prepared taka-moto, leaving the solution for from one to five days until the ferment cells develop and multiply, then filtering or otherwise separating the ferment cells so as to form a semi solid mass; all substantially as shown.

JOKICHI TAKAMINE.

Witnesses:
E. V. HITCH,
E. MOONE.